Nov. 10, 1959

R. L. HARRIS ET AL 2,912,253

AUTOMOTIVE TRAILERS

Filed Nov. 5, 1957

RALPH L. HARRIS,
GLENN M. HARRIS
INVENTORS

BY

ATTORNEYS

Nov. 10, 1959   R. L. HARRIS ET AL   2,912,253
AUTOMOTIVE TRAILERS
Filed Nov. 5, 1957   2 Sheets-Sheet 2

RALPH L. HARRIS,
GLENN M. HARRIS
INVENTORS

BY *Fulwider, Mattingly*
*& Huntley*

ATTORNEYS

United States Patent Office 2,912,253
Patented Nov. 10, 1959

2,912,253

AUTOMOTIVE TRAILERS

Ralph L. Harris and Glenn M. Harris, Victorville, Calif.

Application November 5, 1957, Serial No. 694,591

3 Claims. (Cl. 280—106)

Our invention relates generally to vehicle body structures and more particularly to a new and improved structure for automotive trailers.

In the past, it has been customary to construct heavy duty automotive trailer bodies of heavy structural steel, utilizing I-beams and the like of substantial proportions and weight to provide the structural strength and carry the load. Such construction is extremely heavy, resulting in excessive dead weight with a corresponding reduction of payload, and also requiring larger and more expensive tractor units than are really necessary to handle the pay load.

It has long been deemed desirable to reduce the excessive weight of heavy automotive transport trailers. However, it has been impossible in the past to do so with the customary construction because of the bending forces which come into play over the span of the vehicle between the wheels. Attempts have been made in the past to provide truss undercarriage arrangements for various types of vehicles, but these have never been satisfactorily applied to trailers because of the wheel arrangement, and particularly because of the necessity of a front wheel turning radius, which interferes with the customary truss development.

One of the principal objects of the present invention, therefore, is to provide a satisfactory truss undercarriage for an automotive trailer, which is particularly designed to overcome the shortcomings of prior constructions, and which is designed to provide maximum structural strength with a minimum of structural deadweight.

Another object of the invention is to provide a structural arrangement for the undercarriage of a trailer, which has ample road clearance, and which also provides ample clearance for the turning radius of the steerable wheels.

It is a further object of this invention to provide a truss undercarriage combined with a plate bed, which may be pre-stressed so as to provide a maximum stiffness with minimum weight.

The foregoing and other objects and advantages of this invention will be apparent from the following description when taken in conjunction with the attached drawing, in which.

Figure 1:
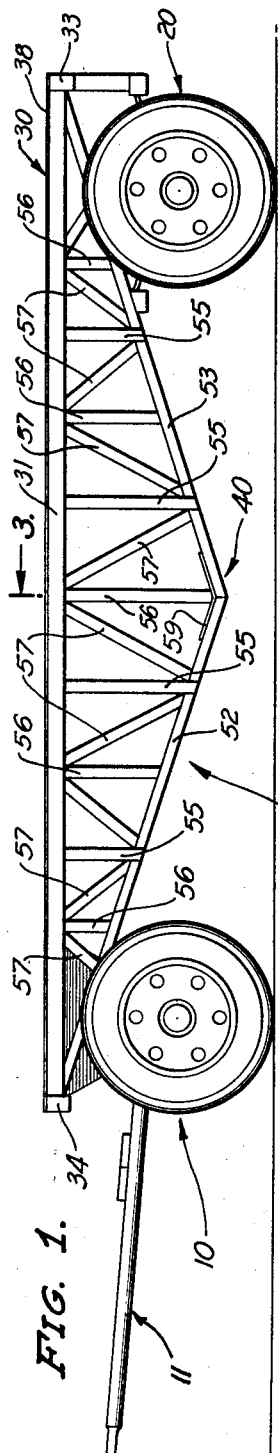
Figure 1 is a side elevation of a preferred embodiment of our invention.
Figure 2:
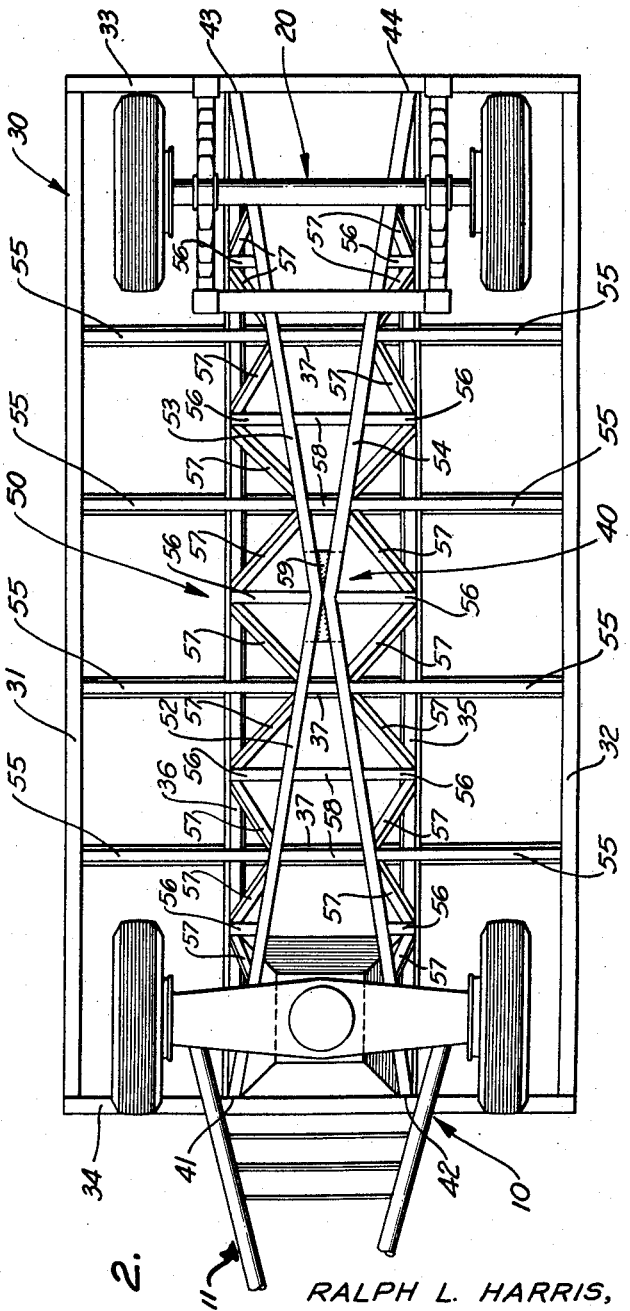
Figure 2 is a plan view of the same, looking upwardly at the underside.

In the drawings, the front wheel and axle assembly are designated generally by the reference numeral 10; the rear wheel and axle assembly are designated generally by the numeral 20; the bed of the trailer is indicated generally by the numeral 30; and the truss arrangement is designated generally by the numeral 50.

The bed of the trailer is formed of a rectangular frame of beams (preferably box beams), consisting of two laterally spaced, longitudinally extending members 31 and 32, and two fore and aft spaced, transversely extending end members 33 and 34 welded together at their ends to form a rectangular frame.

Figure 3:
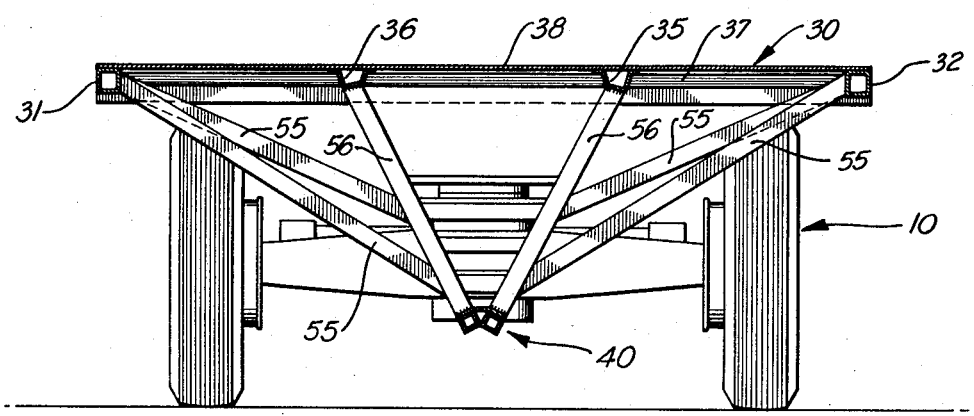
Figure 3 is a section taken at 3—3 of Figure 1.

Two stiffening members 35 and 36, having a generally channel-shaped cross section, as shown in Figure 3, run lengthwise of the frame and extend between end members 33 and 34. The stiffening members 35 and 36 require the cross section approximately as shown in order to make a more perfect alignment supporting trusses which will be identified in detail below. However, it is also possible to use a standard channel or box beam for members 35 and 36, and to cut and fit the abutting ends of the members forming the trusses appropriately. Spaced at longitudinal intervals along the length of the framework are transversely extending bracing members 37 of channel or box cross section, which are welded at their ends to the side members 31 and 32. The principal purpose of members 37 is to join the edges of lengths of sheet metal which compose the bed of the trailer, although they also add some stiffness and structural strength.

The frame composed of the various stringers 31 through 37, as herein described, is covered with a panel of sheet aluminum. Links of this sheet aluminum as required are welded, riveted, or otherwise fastened to the framework composed as heretofore described.

Four principal truss members 51, 52, 53 and 54 are welded respectively to the frame at approximately the point where the longitudinal stringers 35 and 36 join the ends 33 and 34 of the frame. These four principal truss members extend generally downwardly from the four points 41, 42, 43 and 44, and converge towards an approximate center point beneath the trailer, shown generally by the reference 40. Outrigger supports and tension truss members 55 extend directly beneath each of the lateral support stringers 37 from the outer ends of each of said lateral support members downwardly to the point of contact with principal truss members 51, 52, 53 and 54. The truss members 51, 52, 53 and 54 joining at point 40 perform the additional function of stiffening the trailer bed so that twisting due to road irregularities is reduced.

A series of compression truss members 56 extend downwardly from the point of intersection respectively with longitudinal frame members 35 and 36 to points of connection with principal truss members 51, 52, 53 and 54. A number of diagonal truss members 57 extend between and are welded at their ends to the top and bottom truss members 35, 51, 54 and 36, 52, 53 respectively to form compressive and tensile truss sections, as indicated in the drawings. Each of the truss members 57 extends from the top of one of the members 56 to the bottom of the adjacent member 56.

A pair of cross members 58 extend between principal truss members 51 and 52, and 53 and 54, respectively, said members being formed of appropriate channel or box beams in conformance with the balance of the structural members used in the framework.

A plate 59 is welded between the principal truss members 51, 52, 53 and 54, at their apices 40, as indicated. This plate 59 adds strength and rigidity at the converging point 40 and serves to tie the truss members together into an integral structure.

The rear axle asembly 20 is a customary rear axle assembly fastened in customary manner to the frame and/or truss. The front axle assembly 10 is a customary front axle assembly fastened in customary manner to the frame, bed, and/or truss. The tongue 11 is of customary construction and used to attach the trailer in customary manner to a truck.

For the purpose of brevity and simplicity, certain members such as the compressive members 56 and the tensile members 57 have been indicated throughout this description by common reference numerals, even though they are not identical members. Each such member, however, performs a similar service and it will be understood that as the members progress from the center towards the end in each such case or through other variations over the length, and width of the trailer, that the exact size and cross section of the members may be varied. Their common reference numerals do not indicate interchangeability between such members, as will be clear to anyone skilled in the art, but merely that they perform similar functions at different points throughout the structure.

All joints between structural members are welded or bolted in customary manner; and the wheel structure indicated can be replaced by a variety of wheel arrangements including the usual type semi-trailer and tractor construction.

Figure 4:
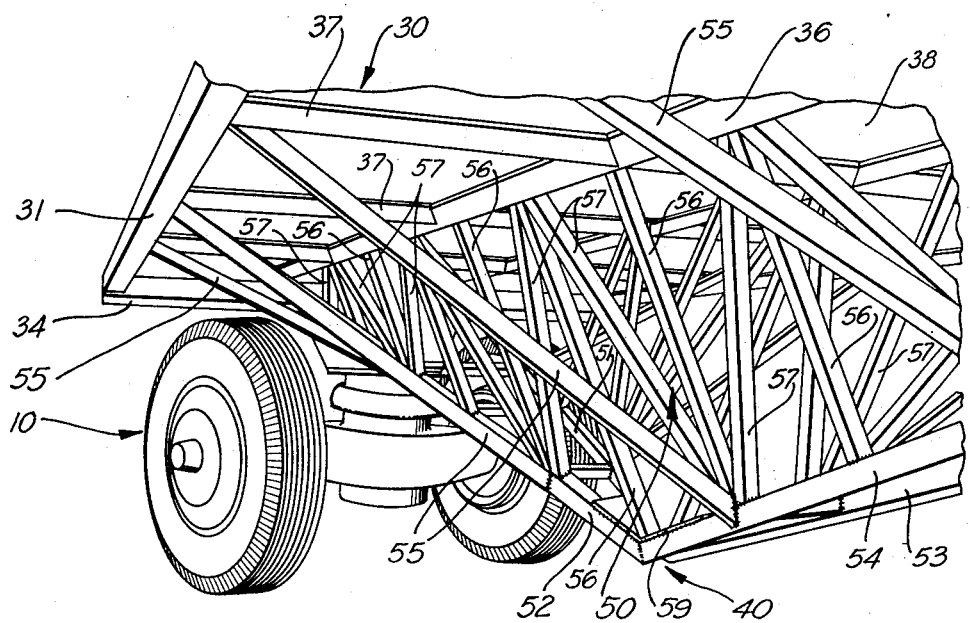
Figure 4 is a cutaway perspective of the front portion of the same embodiment, looking from the rear towards the front.

The structure shown provides ample road clearance and wheel turning clearance, as best shown in Figure 4. Figure 4 shows the front wheel assembly slightly turned, and illustrates how the converging truss arrangement provides clearance of the wheels for normal turning in all road operations.

It will be observed that by the particular structure devised, when a load is placed upon the bed 39 the metal bed plates act as a stressed skin upon a framework and with weight actually stiffen the entire frame. It will be seen that any tendency for the outer edge to sag under load will be resisted by a tightening or tensile holding through the skin because of offsetting stresses and load on the center of each portion. It will be seen further by this peculiar truss arrangement that all stresses converge to the approximate point 40 and are redistributed through the various compressive and tensile members so that an uneven load in the center or other portions of the vehicle has a tendency to distribute its weight by the counteracting forces set up throughout the various members.

While the illustrative embodiment of our invention which we have described is fully capable of performing the functions and achieving the objects and advantages desired, many modifications and changes will be obvious to those skilled in the art and it is not intended that this invention be limited to the particular embodiment shown and described, but only as may be required by the appended claims.

We claim:

1. In an automotive trailer frame: the combination of a rectangular frame; a flat sheet metal surface fastened to said frame; two front principal truss beams fastened at spaced apart points to the front edge of said frame and extending downwardly and rearwardly to a point under the center of said frame; two rear principal truss beams fastened at spaced apart points to the rear edge of said frame and extending downwardly and frontwardly to meet at the point at which the front principal truss beams meet; a plate fastened to all of said principal truss beams at said point where they meet; a plurality of outrigger truss beams, each of said outrigger truss beams fastened at spaced apart points at one end of each of said outrigger truss beams to one side of said frame, and each of said outrigger truss beams extending downwardly to the closest point of intersection of the closest principal truss beam at each of which points said outrigger truss beams is fastened to said principal truss beam; a plurality of compression truss members each of which is fastened at spaced apart points to longitudinal frame members and extend downwardly to the closest points of intersection with the closest principal truss members at which point each is fastened to such principal truss members; a plurality of diagonal truss members, each of which extends from the point of intersection of one compressive truss member with the longitudinal frame member to the point of intersection of the adjacent compressive truss member with the principal truss member.

2. In a vehicle trailer frame: the combination of a bed frame consisting of two laterally spaced longitudinally extending beams and two transversely extending beams all of said beams welded together at their respective ends to form a rectangular frame; a pair of spaced apart longitudinally extending beams extending the length of said frame each beam fastened at each of its ends to one of the ends of said rectangular frame; a plurality of transversely extending beams extending at spaced apart intervals between the longitudinal sides of said frame each of said transversely extending beams being fastened at each end of one of said sides of said rectangular frame; four principal truss members, each of said principal truss members being fastened at one of its ends to the point of intersection of one of said stiffening beams with one of the ends of said frame and all four of the other ends of said principal truss beams being fastened together at a common point located beneath the center of said bed frame; a plurality of outrigger truss beams each of which is fastened at one end to one of the points of intersection between the sides of said frame and the transverse bracing members, the other end of each of said outrigger truss beams being fastened to the closest principal truss member at the point where said outrigger truss beam intersects said principal truss member when said outrigger truss beam has been fastened at its one end to said frame as heretofore stated and is extended in a downward direction with its transverse line of travel parallel to the plane of the transverse bracing members at right angles to the plane of said rectangular frame; a plurality of compression truss members one extending between each of the points of intersection between the outrigger truss beam and the principal truss beams and the point of intersection closest thereto between a transverse bracing beam and a longitudinal stiffening beam in said frame; a plurality of tensile truss beams each of which is fastened at one end to the point of intersection of said principal truss beams and outrigger truss beams and extends upwardly to the closest longitudinal stiffening beam of said frame at the point which is midway between two adjacent transverse bracing beams, in each case there being one of said tensile truss beams extending towards said point generally rearwardly from said point of intersection of said principal truss beam and of said outrigger truss beam and one of which tensile truss beams extends forwardly from said point of intersection of said outrigger truss beam and principal truss beam; and one of said tensile truss beams extending between each of the forward points of intersection of the outrigger truss beams and the principal truss beams and the rear points of intersection of outrigger truss beams and principal truss beams in an upwardly direction to point of intersection with said closest longitudinal stiffening beam at points respectively forward or rearward upon said longitudinal stiffening beam a distance equal to one-half the distance between adjacent transverse bracing beams, and four additional tensile beams, one extending from each of said points of intersection of the last mentioned tensile beams with said longitudinal stiffening beams downwardly at approximately 45° angle to the point of intersection respectively frontward and rearward of the last point of intersection of the frontward outrigger and rearward outrigger truss beams with said principal truss beams; a plurality of secondary compression truss beams each fastened at one end to one point of intersection of two of said tensile truss beams on the said longitudinal stiffening beams and extending downwardly parallel to the planes through said transverse beams which are perpendicular to the plane of said rectangular frame to the point of intersection with the closest principal truss beam at which point each of said secondary compression truss beams is fastened to said principal truss beams; a number of flat metal plates welded to the side of said trailer bed frame opposite the side under which said various truss beams extend and covering the whole of said trailer bed frame.

3. A vehicle frame comprising a rectangular frame work, at least two longitudinal stiffeners substantially uniformly spaced between the sides of said framework, a plurality of transverse stiffeners substantially uniformly spaced between the ends of said framework, four downwardly and inwardly depending principal truss beams each of said four principal truss beams having its upper end connected to one end of one of said two longitudinal stiffeners the other ends of all of said principal truss beams joining at a point beneath the said rectangular framework a series of secondary beams each extending in a transverse plane from the intersection of each of said transverse stiffeners with the outer edge of the said rectangular framework to the said principal truss beams and each being fastened securely at one end to such principal truss beam and at its other end to the point of intersection of said rectangular framework and such transverse stiffener; a plurality of minor truss members extending between and fastened to various points upon said principal truss members and said longitudinal stiffeners, and a panel of sheet metal secured to the upper surface of said framework.

References Cited in the file of this patent

UNITED STATES PATENTS

| | | |
|---|---|---|
| 401,529 | Zurcher | Apr. 16, 1889 |
| 1,591,215 | Jacobs | July 6, 1926 |
| 2,055,594 | Steinecke | Sept. 29, 1936 |
| 2,346,130 | Evans | Apr. 11, 1944 |
| 2,355,997 | Mueller | Aug. 15, 1944 |
| 2,547,580 | Jessen | Apr. 3, 1951 |
| 2,743,940 | Bohlen | May 1, 1956 |